April 6, 1937.  E. LEITZ, JR  2,075,856
OPTICAL DRILLING TOOL
Filed Dec. 14, 1935  2 Sheets-Sheet 1

Ernst Leitz jr.
INVENTOR

BY
ATTORNEY

April 6, 1937.  E. LEITZ, JR  2,075,856
OPTICAL DRILLING TOOL
Filed Dec. 14, 1935  2 Sheets-Sheet 2
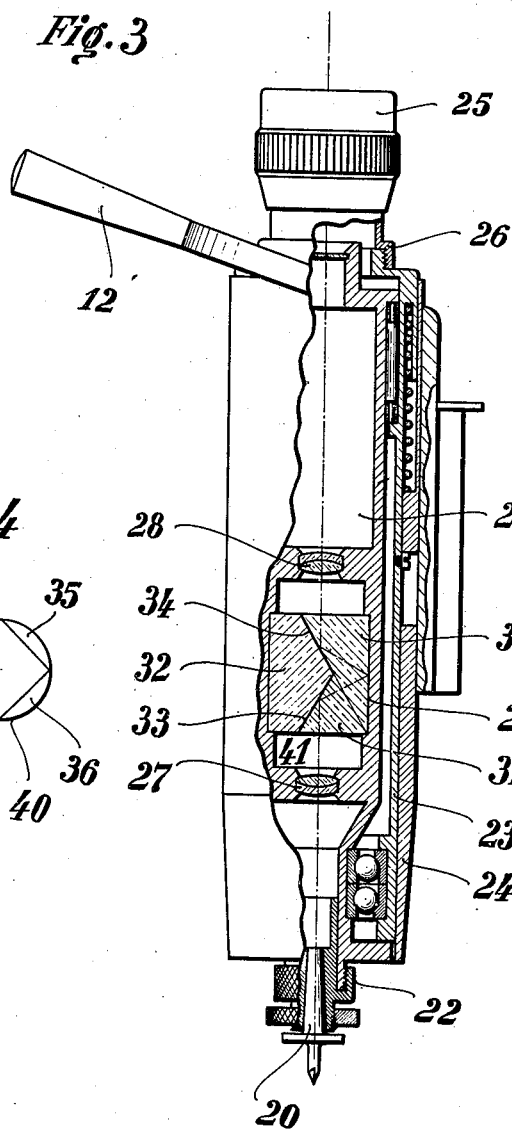
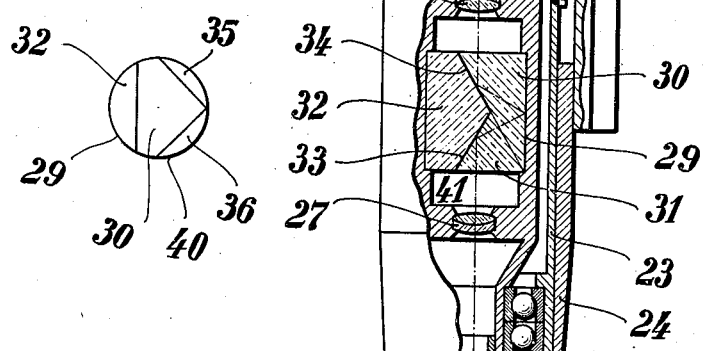
Ernst Leitz jr.
INVENTOR
BY Ivan E. A. Königsberg
ATTORNEY Patented Apr. 6, 1937

2,075,856

UNITED STATES PATENT OFFICE 2,075,856

OPTICAL DRILLING TOOL

Ernst Leitz, Jr., Wetzlar, Germany, assignor to Ernst Leitz, G. m. b. H., Wetzlar, Germany Application December 14, 1935, Serial No. 54,383
In Germany January 2, 1935

3 Claims. (Cl. 77—5)

The object of this invention is to provide a drilling tool with optical means whereby the work may be inspected from time to time during the drilling operation without removing the tool from the work.

Such a tool is of particular advantage in cases where for instance the operations require marking, by boring, of centres of holes to be bored or drilled, or where other marks are required to be made for other purposes. In the manufacture of precision instruments or parts of machinery absolute exactness is often or always of the greatest importance. In such cases it is necessary that the work be frequently inspected. Heretofore such inspections have required the use of two pieces of apparatus, namely the drilling tool and the optical instrument, for example a microscope. Not only is such a procedure expensive and slow but it does not insure absolute exactness because it is very difficult to place the optical axis of a microscope in exact alinement with the working axis of the drill or tool. The present invention accomplishes the object with only one piece of apparatus and insures absolute exactness in that the tool axis is permanently coincidental with the optical observation axis.

The invention is accordingly embodied in a drilling tool with a built-in optical system for observing the work. The apparatus is so arranged that only the tool itself need be removed for observation purposes. When the drilling operation is to be resumed the ocular is removed and the tool coupled to its usual driving means.

In the accompanying drawings illustrating the invention

Fig. 3 is a view similar to Figure 1 but shows a different more developed optical system which may be used for purposes of greater exactness.

Fig. 4 is an end view of the prism shown in Figure 3.

Figure 1:
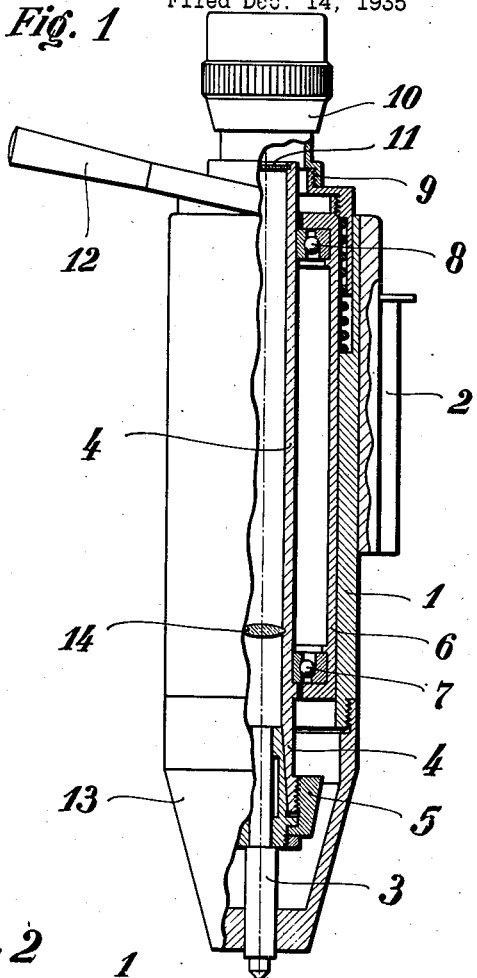
Fig. 1 is a longitudinal sectional view illustrating a drilling tool embodying the invention.
Figure 2:
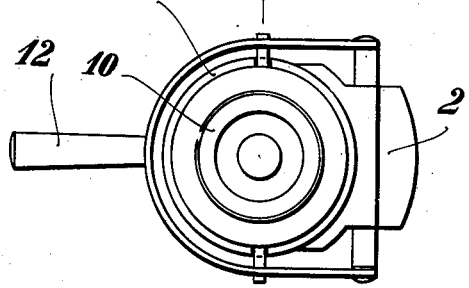
Fig. 2 is a rear end view of the tool.

Referring to Figures 1 and 2 the reference numeral 1 denotes the tool casing of usual tubular form which by means of a suitable bracket 2 is secured to a drilling machine in a usual and well known manner, not illustrated. The drilling tool 3 is detachably secured to the hollow drill shaft 4 by means of a well known form of chuck 5. The shaft 4 is supported within the movable guide tube 6 by means of ball bearings 7 and 8. At the other end of the tool there is a coupling ring 9 for connecting the eye piece or ocular 10 to the tool. 11 indicates the usual cross or sight made of fine threads. A lever 12 is operated in the usual manner to feed the drill. 13 is a detachable cap. The lens 14 is mounted permanently within the hollow shaft 4 and forms together with the ocular 10 a complete optical system as is obvious.

When the tool is to be used for drilling, the drill 3 is attached to the shaft 4 as usual, the cap 13 being of course first removed and then replaced. At the other end of the tool the coupling 9 is likewise removed so that the projecting shaft 4 may be attached to any suitable driving mechanism. Such driving mechanism may of course be of a very simple nature, for instance a mere manually operated handle may be attached when the drill is used for marking purposes. Such driving mechanism or handles are known in the art and are therefore not shown. When it is desired to inspect the work, the tool is moved rearwards by means of the lever 12 in order to permit the cap 13 and the tool 3 to be removed. The driving means or handle, if such is used, is disconnected from the shaft 4. The ocular is then attached and the work may then be inspected. In the drawings the tool is shown at the moment when it is ready for optical use by simply removing the cap 13 and the drill 3.

Figure 3 illustrates a drilling tool of the type shown in Figure 1 but provided with a more elaborate optical system for purposes of greater exactness and a wider scope of optical observation. This figure also shows a somewhat differently constructed drilling tool. It is obvious that the invention is not limited to any particular mechanical form of drilling tool but is applicable to drilling tools capable of including a hollow drilling shaft to support the optical system.

In Figure 3 therefore reference will be made only to the parts directly involved in the invention. In this figure the drill 20 is detachably operatively connected to the hollow drill shaft 21 by means of a suitable clutch 22. 23 is the movable guiding tube supported within the outer casing or tube 24. The operating lever is designated 12 as in Figure 1. 25 is the ocular removably held by coupling means as at 26.

The optical system in Figure 3 comprise the two lenses 27 and 28, and a cylindrical optical glass body 29. The latter consists of three reflecting prisms 30, 31 and 32 having coincidental silvered surfaces 33 and 34. The prisms have partly rounded surfaces as shown in Figure 4 and the cylindrical form of the body 29 is completed by the non-reflecting segmental glass bodies 35 and 36. Hence the glass or prism body 29 has a complete cylindrical surface 40 which is supported within the recess 41 in the hollow shaft.

The optical properties of the elements of the prism 29 are such that the image forming rays are divided in the surface 33. Some of the rays are reflected through the prisms 31 and 30, the other rays pass directly through. All of the rays unite again in the surface 34. In this manner there is obtained a direct image as well as a laterally displaced and inverted image as will be understood by persons skilled in the art. The optical system in Figure 3 serves the purposes of greater exactness and a wider scope of observation.

The operation of the device in Figure 3 is the same as that described above. When optical observation is desired, the drill 20 is disconnected and the ocular 25 is attached. It will be understood that the invention is not limited to the precise forms illustrated and described but that changes may be made without departing from the principle of the invention and the scope of the appended claims. It will further be understood that the optical system need not necessarily be combined with a drilling tool. The scope of the invention is intended to include tools other than drilling tools.

I claim:

1. In a working tool including a hollow operating shaft, an optical system in said shaft, means for detachably connecting a tool to one end of said shaft being driven thereby and means for detachably connecting the ocular of said optical system to the other end of said shaft whereby to observe the work when said tool is detached, the optical axis of said optical system being coincidental with the operable axis of the said shaft and tool.

2. A tool comprising in combination a hollow shaft, means for detachably securing a drilling tool to one end of the shaft to be operated thereby, a lens permanently mounted in the shaft, means for detachably securing an ocular at the other end of said shaft to form a microscope together with the said lens, the optical axis of the said ocular and lens coinciding with the operating axis of the said drilling tool and means for supporting said shaft.

3. A tool comprising in combination a hollow shaft, means for detachably securing a drilling tool to one end of the shaft to be operated thereby, a plurality of optical bodies permanently mounted in the shaft, means for detachably securing an ocular at the other end of said shaft to form a microscope together with the said optical bodies, the optical axis of the said ocular and optical bodies coinciding with the operating axis of the said drilling tool and means for supporting said shaft.

ERNST LEITZ, Jr.